(No Model.) 8 Sheets—Sheet 1.

J. A. PLOPPER.
AUTOMATIC BOLT THREADING MACHINE.

No. 590,463. Patented Sept. 21, 1897.

Witnesses.
Arthur Johnson
Charles A. Steward

Inventor:
James A. Plopper.

(No Model.) 8 Sheets—Sheet 3.

J. A. PLOPPER.
AUTOMATIC BOLT THREADING MACHINE.

No. 590,463. Patented Sept. 21, 1897.

Witnesses,
Arthur Johnson
Chas. A. Steward

Inventor
James A. Plopper (No Model.) 8 Sheets—Sheet 4.
J. A. PLOPPER.
AUTOMATIC BOLT THREADING MACHINE.
No. 590,463. Patented Sept. 21, 1897.
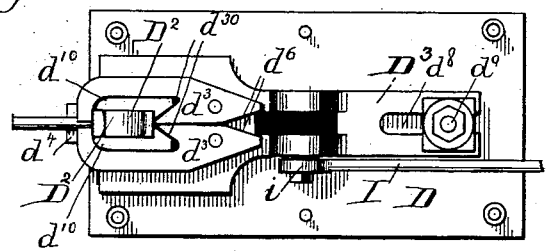
Fig. 5.
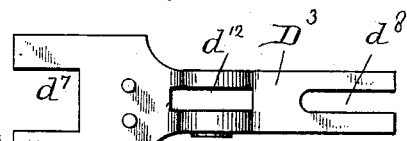
Fig. 7.
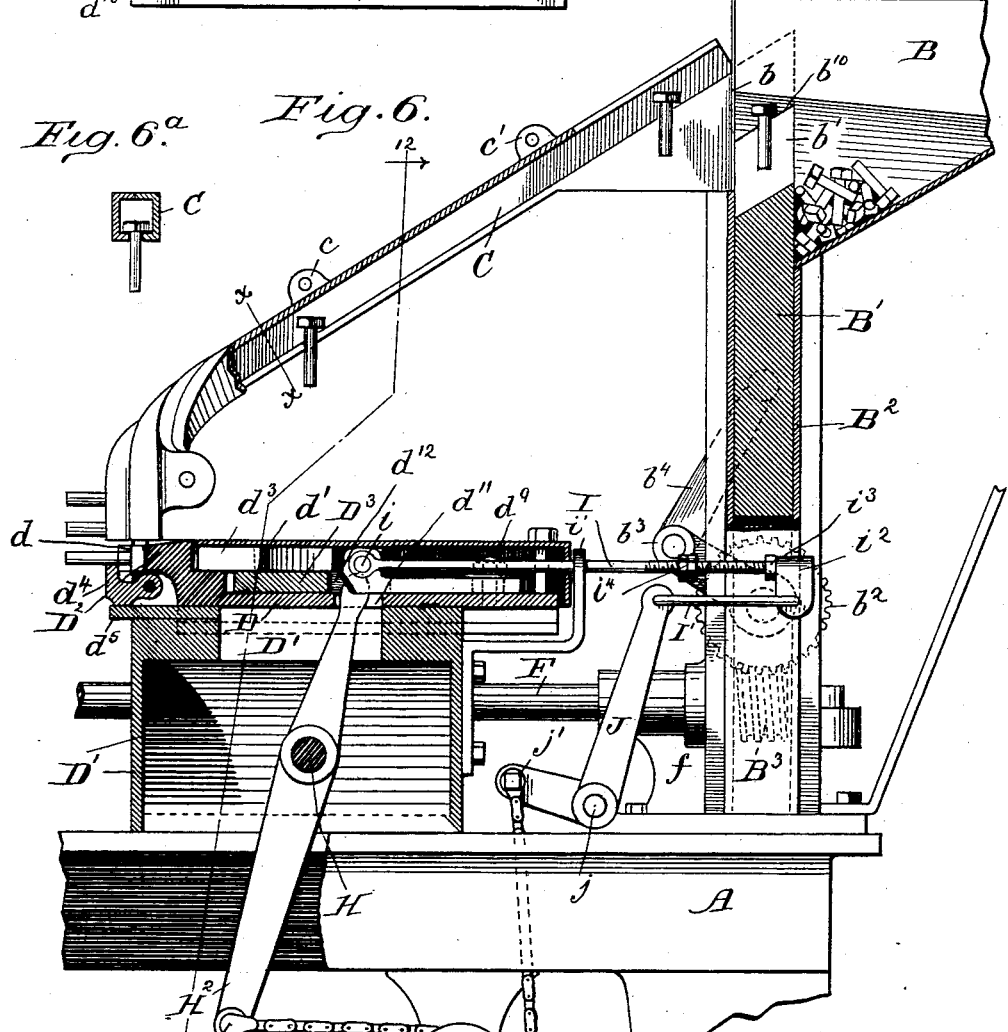
Fig. 6.ᵃ  Fig. 6.
Witnesses
Arthur Johnson
Chas. A. Steward
Inventor
James A. Plopper (No Model.) 8 Sheets—Sheet 5.
J. A. PLOPPER.
AUTOMATIC BOLT THREADING MACHINE.
No. 590,463. Patented Sept. 21, 1897.
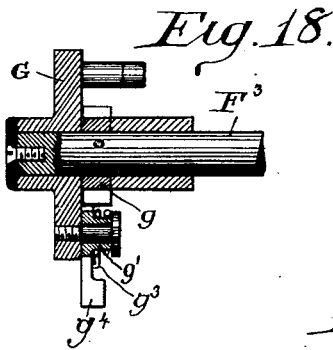
Fig. 18.
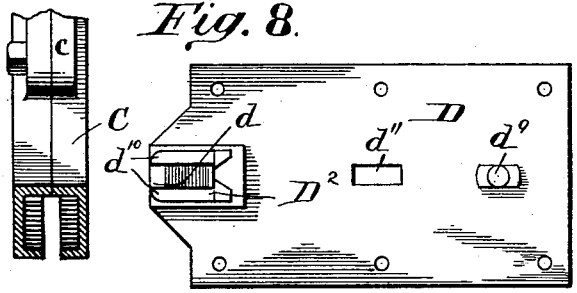
Fig. 8.
Fig. 12.
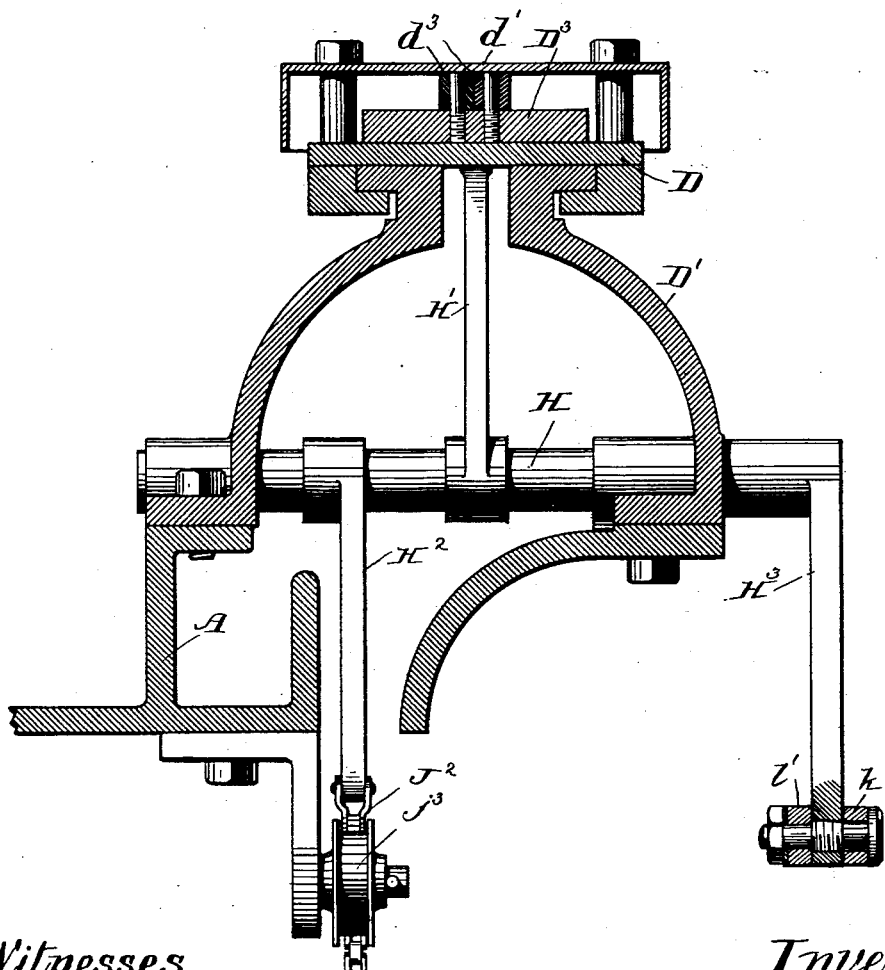
Witnesses.
Arthur Johnson
Chas. A. Steward
Inventor
James A. Plopper (No Model.) 8 Sheets—Sheet 6.
J. A. PLOPPER.
AUTOMATIC BOLT THREADING MACHINE.
No. 590,463. Patented Sept. 21, 1897.
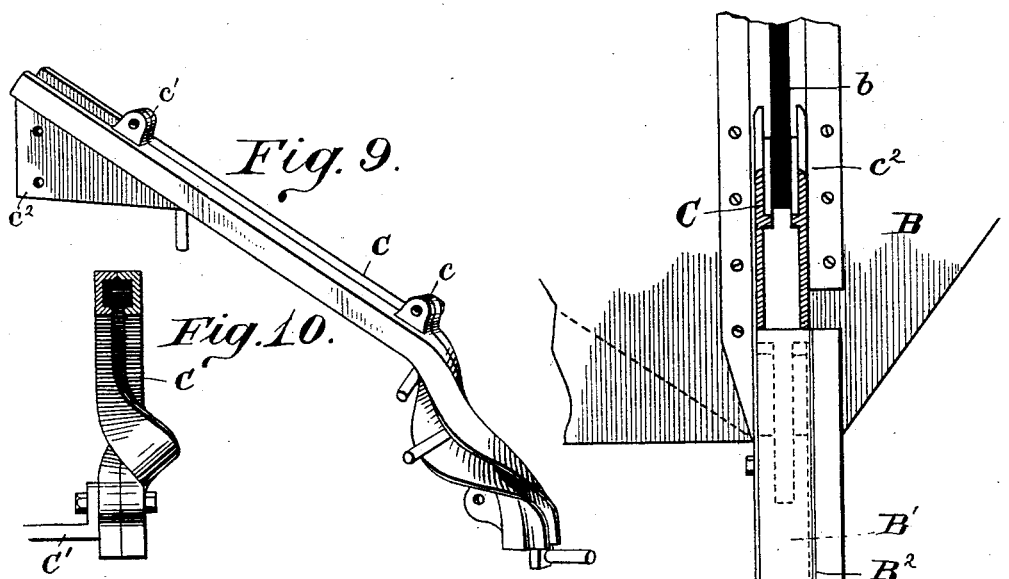
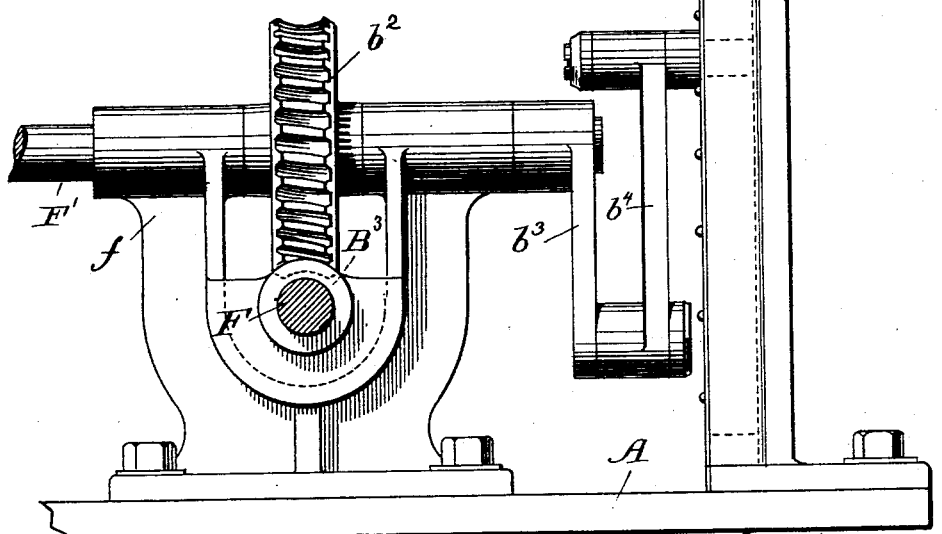
Witnesses
Arthur Johnson
Chas. G. Steward
Inventor
James A. Plopper (No Model.) 8 Sheets—Sheet 7.

J. A. PLOPPER.
AUTOMATIC BOLT THREADING MACHINE.

No. 590,463. Patented Sept. 21, 1897.

Witnesses.
Arthur Johnson
Chas. A. Steward

Inventor.
James A. Plopper.

(No Model.) 8 Sheets—Sheet 8.
J. A. PLOPPER.
AUTOMATIC BOLT THREADING MACHINE.
No. 590,463. Patented Sept. 21, 1897.
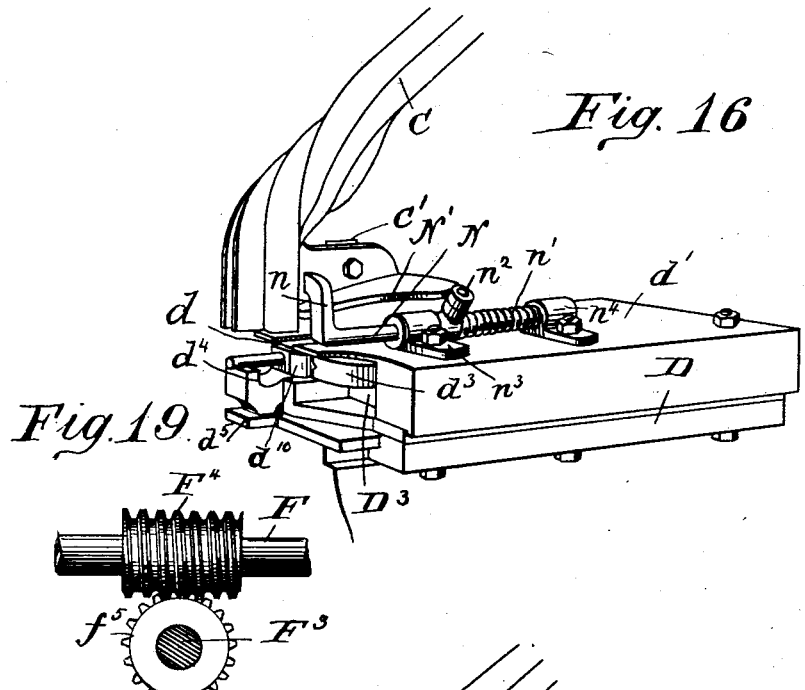
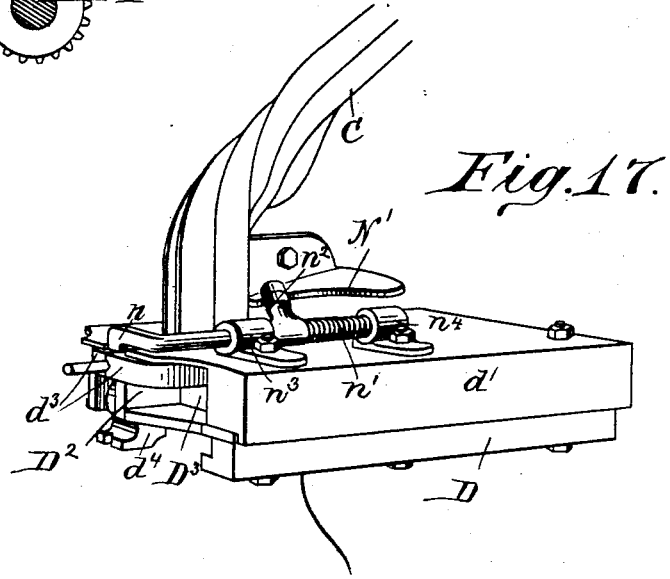
Witnesses
Arthur Johnson
Chas. A. Steward
Inventor
James A. Plopper

UNITED STATES PATENT OFFICE.

JAMES A. PLOPPER, OF CHICAGO, ILLINOIS, ASSIGNOR TO THE DEERING HARVESTER COMPANY, OF SAME PLACE.

AUTOMATIC BOLT-THREADING MACHINE.

SPECIFICATION forming part of Letters Patent No. 590,463, dated September 21, 1897.

Application filed May 25, 1896. Serial No. 593,025. (No model.)

*To all whom it may concern:*

Be it known that I, JAMES A. PLOPPER, of Chicago, in the county of Cook and State of Illinois, have invented certain new and useful Improvements in Automatic Bolt-Threading Machines, of which the following is a clear and full description, reference being had to the accompanying drawings, in which—

Figure 1:
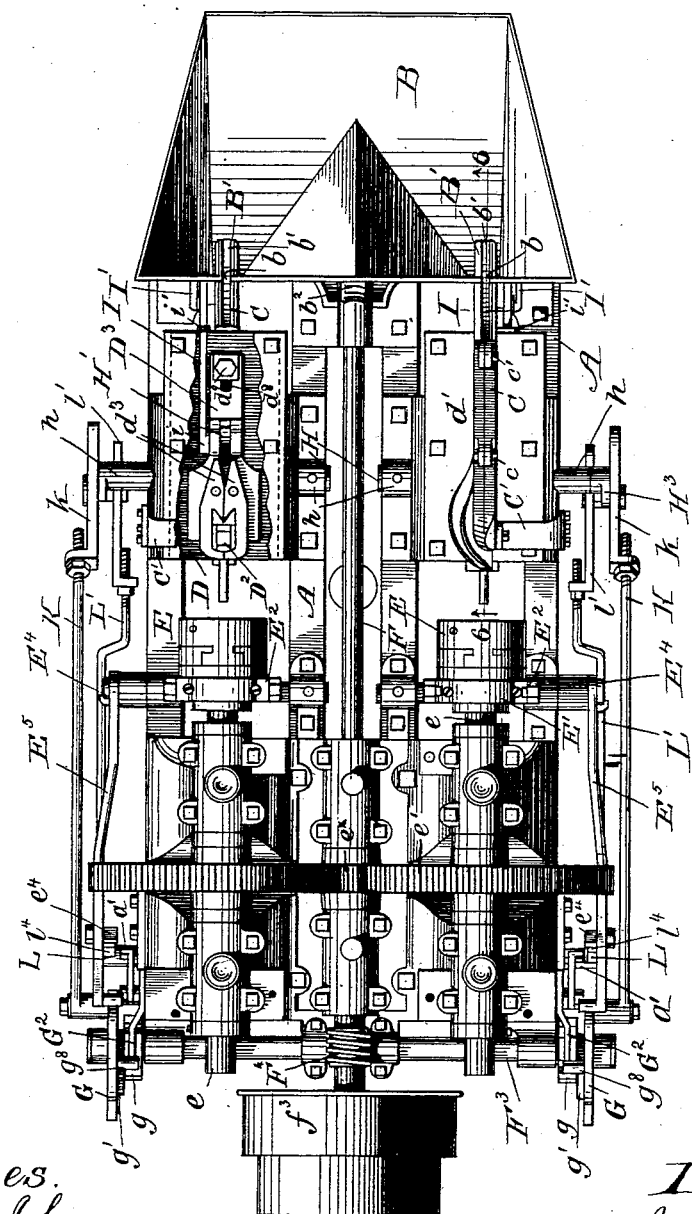
Figure 2:
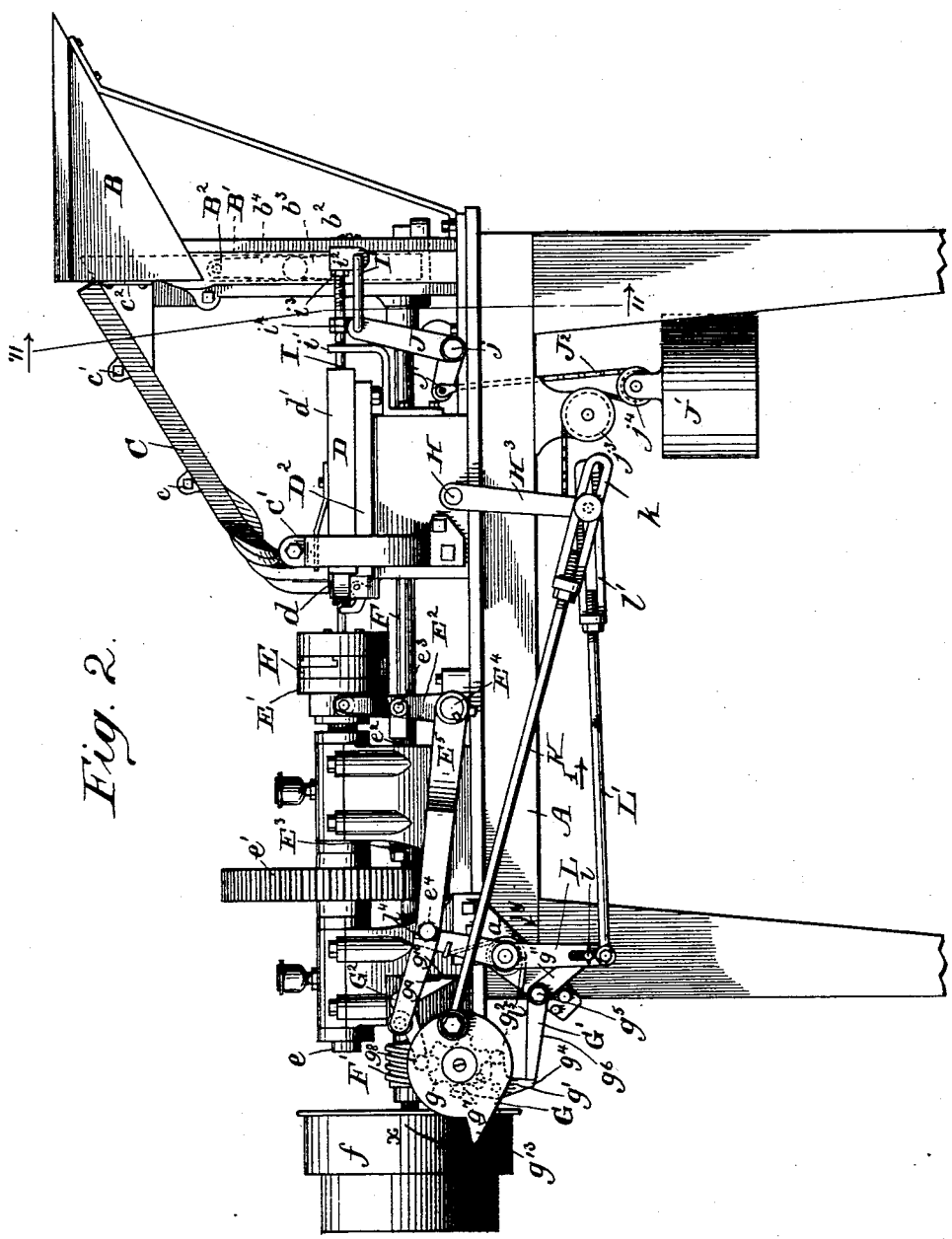
Figure 3:
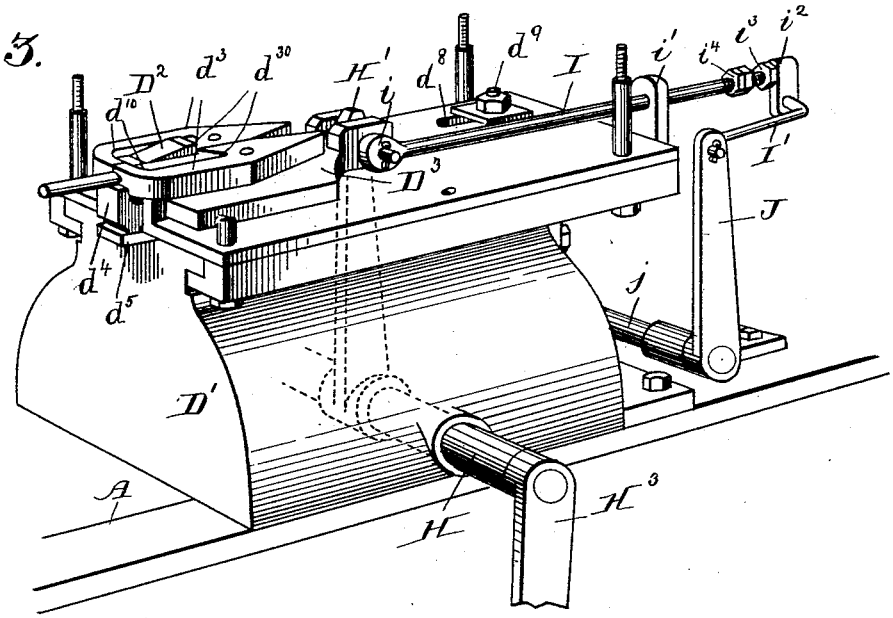
Figure 4:
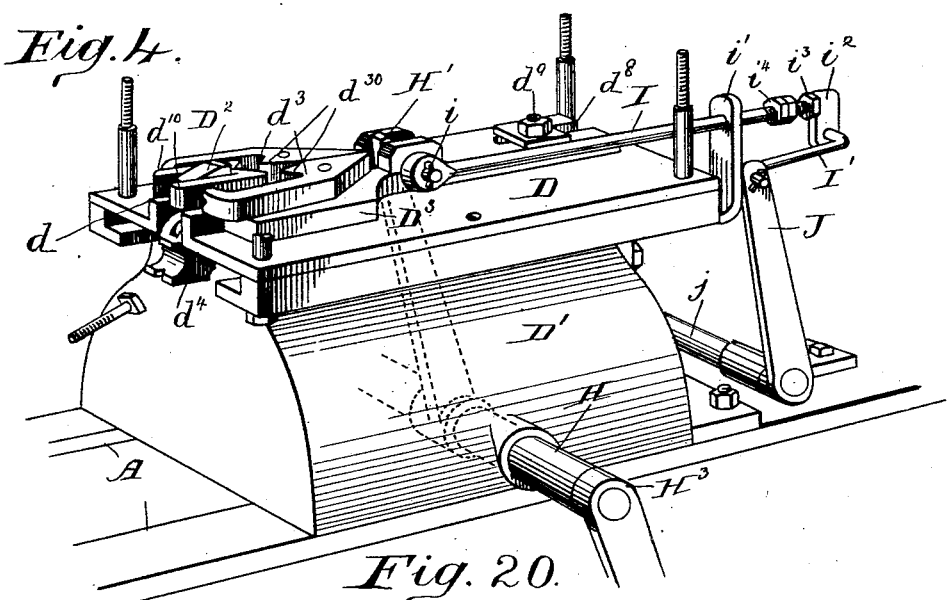
Figure 20:
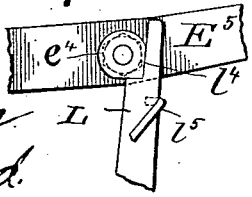
Figure 13:
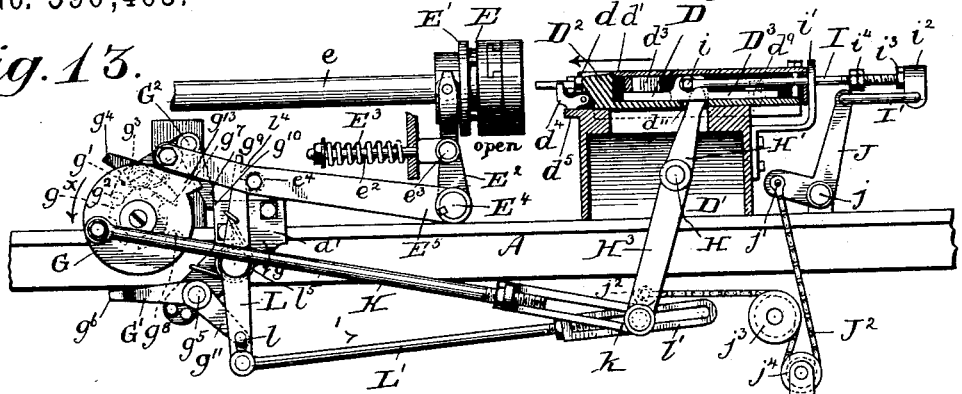
Figure 14:
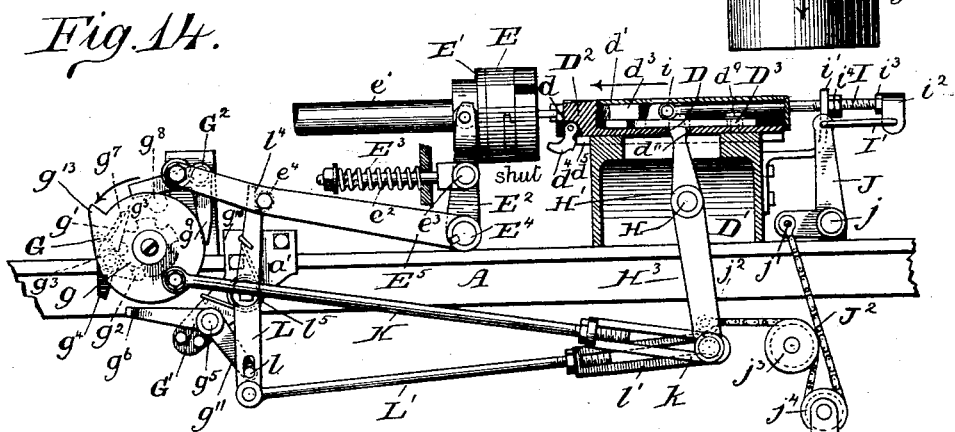
Figure 15:
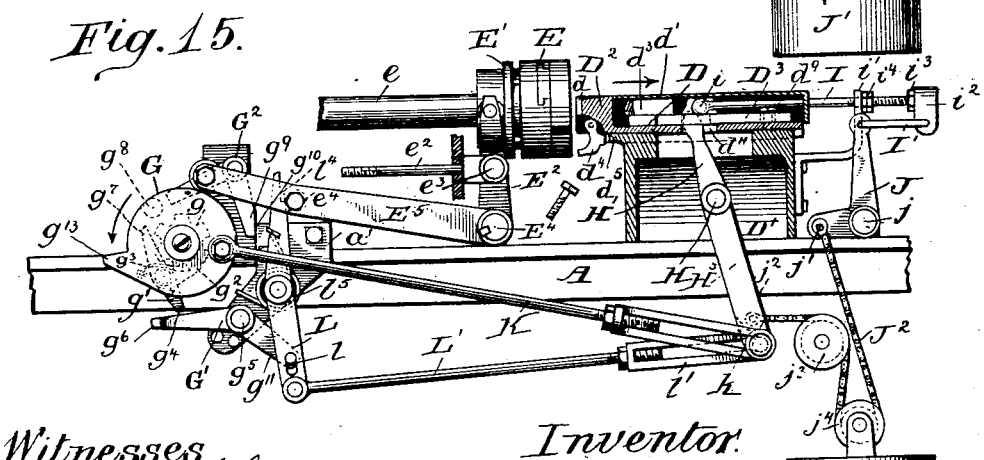

Figure 1 is a plan view of a double machine mounted on a suitable frame. Fig. 2 is a side elevation. Fig. 3 is a perspective view of the bolt-carriage and its associated parts with the bolt gripped preparatory to a forward movement. Fig. 4 is a similar view with the parts in the position in which the bolt is released and dropped preparatory to a retrograde movement of the carriage. Fig. 5 is a plan view of the bolt-carriage. Fig. 6 is a side elevation, partly in section, of the bolt-carriage, the hopper, the chute, and the means for operating the moving parts of the same. Fig. $6^a$ is a cross-section on the line X X of Fig. 6. Fig. 7 is a plan view of the plate carrying the gripping-jaws. Fig. 8 is a plan view of the bolt-carriage. Fig. 9 is a perspective view of the chute. Fig. 10 is a sectional elevation of the same. Fig. 11 is a cross-section on the line 11 11 of Fig. 2. Fig. 12 is a section upon the line 12 12 of Fig. 6. Figs. 13, 14, and 15 are side elevations showing the means for moving the bolt-carriage and for opening and closing the chuck. Figs. 16 and 17 are perspective views of a spring-held bolt-holder. Fig. 18 is a detail of the timing-disk and its operating mechanism. Fig. 19 is a detail of the driving mechanism, and Fig. 20 is a detail of the chuck-operating devices.

The object of my invention is to produce an automatic bolt-threading machine that shall be more perfect in operation than has heretofore been obtained; and it consists of means whereby unthreaded bolts are taken from a hopper in which they are promiscuously and loosely thrown, fed to a vise or bolt-gripping device that is adapted to be moved to and from the die-carrying chuck, and there threaded, after which they are dropped and the operation repeated.

It further consists in means for operating these mechanisms, as will be hereinafter more clearly pointed out.

The devices forming the subject-matter of this application are shown in Fig. 1 in duplicate, but in the following description and the remaining drawings one machine—the right-hand one, looking toward the hopper—is only referred to, it being understood that the left-hand one is similar thereto.

The various devices are supported upon a frame A, which needs but little description, it being of any convenient form.

The hopper B, in which the bolts to be threaded are thrown loosely and promiscuously, is situated conveniently at one end of the machine and has two slots, one for each machine, in its inner wall, which are preferably in the vertical plane of the axes of the shafts upon which the chucks are mounted. A plunger B', slotted at its upper end, as at $b'$, is adapted to be reciprocated vertically in a guideway $B^2$, its upper or slotted end being thrust up and down in the hopper B, immediately to the inside of one of the slots $b$. The bolts lying loosely in the hopper B slide down to the bottom of said hopper onto the plunger B' when it is in its lowest position. The slot in the upper end of the plunger B' is narrower than the heads of the bolts to be operated upon, and hence in the upward movement of the said plunger one or more bolts are carried upward by their heads and separated from the supply, as shown in Fig. 6. When this plunger reaches its uppermost position, it forms, practically, a continuation of the chute C, and the bolts slide down the upper inclined surface $b^{10}$ thereof into the chute. The plunger B' receives its movement from a worm $B^3$ upon the shaft F, which worm engages a worm-wheel $b^2$. The said wheel $b^2$ is mounted upon a shaft F', suitably journaled in the casting $f$. To the shaft F' is secured a crank $b^3$. A pitman $b^4$ connects the said crank to the bar B'.

Coming now to the chute C, it will be seen by referring to Figs. 6 and 9 that the shape of this part is such that as each bolt slides down it the said bolt is deflected from a vertical position to a horizontal position when it reaches the recess $d$ in the head $D^2$ of the carriage D. The chute is preferably formed in two parts, secured together at $c$ and $c'$ and secured to the side of the hopper at $c^2$ at its receiving end and to the bracket C' at its delivery end. As the bolt reaches the recess $d$ it is in a substantially horizontal position and projects toward the chuck E, or it may be said to lie in a position coincident with the axis of said chuck. The recess $d$ is adapted to receive the head of the bolt and hold it against the pressure of the dies when it is presented thereto. The stem of the bolt is held substantially horizontally or in line with the axis of the chuck by means of the shuttle $d^4$, pivoted to the bolt-carriage D, until the said bolt is grasped by the gripping devices. Reference to Figs. 6, 13, 14, and 15 will show that as the carriage is carried toward the chuck the shuttle slides upon the part $d^5$ of the carriage-support D' until it passes the same and falls away from the bolt. Upon the retrograde movement of the bolt-carriage the shuttle is again brought up to its receiving position. As will be seen in Fig. 6, when the bolt immediately to be operated upon reaches its position in the recess $d$ the second bolt will lie immediately above it, there being a slight distance between the bottom of the chute and the head of the bolt. It will also be noticed that from the bolt the upper surface of the head $D^2$ inclines rearwardly, which inclination is for the purpose of raising the second bolt out of the way as the said carriage passes under the chute toward the chuck E. The shield $d'$ of the carriage forms a gate to the delivery end of the chute while the thread is being cut upon the bolt and until the said carriage reaches its rearward position to allow the placement of a new unthreaded bolt in the recess $d$. A plate $D^3$ is adapted to slide upon the carriage D to a limited extent, as will be hereinafter shown. It is held in its position by its slots $d^7$ and $d^8$ engaging the sides of the head $D^2$, in which the recess $d$ is formed, and the bolt $d^9$, respectively. Mounted thereon are the pivoted vise-jaws $d^3$. Referring to Figs. 3, 4, and 5, it will be noticed that these jaws have angular portions $d^{30}$. It will further be noticed that there is a V-shaped slot cut vertically in the rear of the head $D^2$ of the carriage D. When the plate is slid on the carriage toward the chuck, the angular portions $d^{30}$ of the jaws enter the V-shaped slot in the head $D^2$ and engage the sides thereof, the said V-shaped slot acting as a cam to close the jaws onto the bolt immediately in front of its head. A rearward movement of the plate causes the forward portion of the jaws to cam against the forward extremities $d^{10}$ of the head $D^2$ and to open by contact therewith. The rear extremity of the said jaws is tapered in order to allow the jaws to open. When the plate is moved on the carriage toward the chuck and grasps the bolt, the said bolt acts as a stop to a further independent movement of the plate, and thereby the plate is allowed to move the carriage upon which it is mounted along with it. When the thread has been cut upon the bolt, a reverse movement is given, first to the plate to open the jaws and release the bolt and then to move the plate and the carriage away from the chuck.

The mechanism for giving the vise-carriage and its associated parts their proper movement will be described with reference to Figs. 13, 14, and 15. H is a rock-shaft conveniently journaled in the carriage-frame D' of the machine, having an arm H', that extends upward into the slots $d^{11}$ and $d^{12}$ in the bolt-carriage D and the sliding plate $D^3$. $H^2$, Fig. 6, is a downwardly-extending arm secured to the said rock-shaft. A rod I is pivoted to the sliding plate at $i$ and supported in the bracket $i'$. At its rear or outer end $i^2$ it is adapted to be connected by a link I' to the arm J. The part $i^2$ may have an internal thread cut therein and may be secured to the rod I by means of a lock-nut $i^3$. The arm J is secured to a rock-shaft $j$, which rock-shaft has an arm $j'$. A weight J' is connected to the arm $j'$ and to the arm $H^2$ by a chain $J^2$, that runs over a sheave $j^3$, supported conveniently on the main frame, and the sheave $j^4$ upon the said weight. The stress of the weight is exerted through the rock-shaft $j$ and its parts upon the rod I to first move the sliding plate $D^3$ toward the chuck E in order that the vise-jaws $d^3$ may grip the bolt, the gripping of which locks the said plate to the carriage, and then to move both those parts bodily toward the chuck to present the bolt to the dies therein. When the thread has been cut on the bolt, the chuck is caused to be opened, as will be hereinafter explained, and the bolt-gripping device caused to open and to release the bolt and allow it to drop away from the machine, as will also be hereinafter explained. The rear end of the rod I is threaded a considerable portion of its length, and screwed thereon are two lock-nuts $i^4$, capable of forming an adjustable stop. In cutting a long thread on a comparatively short bolt it is desirable that the vise opens quickly before a retrograde movement of the bolt-carriage is commenced, and the purpose of this adjustable stop $i^4$ is to form a stop to prevent a further movement forward of the sliding plate, in which case the stress of the weight J' will be exerted through the arm H' bearing upon the forward end of the slot $d^{11}$ to move the carriage itself. This will have the same effect upon the jaws as if they were moved rearward and the carriage held stationary.

Turning back to Fig. 1 for a moment, an ordinary cone-pulley $f^3$ will be found mounted thereon by which it is given rotation from the line-shafting or prime motor. To give rotation in a desirable manner to the timing-shaft $F^3$, a worm $F^4$ on the shaft F engages a worm-wheel $f^5$, mounted on the said shaft $F^3$. The said timing-shaft is constantly revolved and has loosely mounted thereon in any convenient manner the timing-disk G, which disk may be connected therewith so as to be driven thereby at intervals by means of a clutch-disk $g$, secured to the said shaft. A spring-held pawl $g'$ is pivoted upon the timing-disk and is adapted to engage recesses in the said disk $g$. The pawl $g'$ has an arm $g^2$, which is adapted to engage any one of the indentations in the clutch-disk $g$. The said pawl is rocked upon its pivot on the disk G by a spring $g^3$, the stress of which is exerted to force the said pawl normally into engagement with the clutch-disk. A second arm $g^4$ upon the pawl projects outwardly. A trip-stop G', pivoted on the bracket $a'$ at $g^5$, is adapted to be rocked upon its pivot, so that its arm $g^6$ is projected into the path of the arm $g^4$ for the purpose of tripping the pawl out of engagement with the clutch-disk, thus disconnecting the timing-disk from the timing-shaft and holding the said timing-disk from further rotation. An arm $g^7$ on the pawl $g'$ prevents the said pawl from turning completely around on its pivot when stopped by the trip-stop G' by striking the hub of the timing-disk. The said timing-disk is prevented from a retrograde rotation by a dog $G^2$, pivoted conveniently upon the main frame and projecting normally in the path of the pin $g^8$ upon the said disk, which pin when it rotates beneath the said dog (see Fig. 14) does not interfere therewith except to raise it. Should the timing-disk rotate backwardly, the pin $g^8$ will strike the end of the dog $G^2$. The stop $g^9$ upon the said dog determines its normal position by coming in contact with the frame at $g^{10}$. An arm $H^3$ is also secured to the rock-shaft H. It is connected to the timing-disk G by a rod K. Fig. 2 shows the timing-disk in its locked position. When the trip-stop is moved to release the dog and cause the timing-disk to rotate with the shaft $F^3$, it will revolve in the direction of the arrow X and cause, by means of the pitman K and the arm $H^3$, the bolt-carriage to move back to its rearward position and at the same time will raise the weight J preparatory to a succeeding operation. In Fig. 2 I have shown the slotted end $k$ of the rod K somewhat longer than is shown in Figs. 13, 14, and 15 for the purpose of making it understood that when a comparatively short thread is cut upon a long bolt the entire movement of the timing-disk need not be exerted in order to move the carriage the short distance back to its rearward position in which the recess $d$ is underneath the delivery end of the chute ready for a succeeding bolt to drop therein. When a comparatively short bolt has to be carried from the delivery end of the chute to the chuck and a thread cut thereon, the entire fore-and-aft movement given to the pitman K by the timing-disk may be necessary, as will be seen in Figs. 13, 14, and 15. It must not be forgotten in connection with the adjustability in the length of this pitman-rod K that the carriage has a definite rearward position—that is, a position in which the bolt to be operated upon can drop from the chute into the recess $d$—but that the necessary movement of the carriage toward the chuck varies as the length of the bolt varies and as the length of the thread to be cut on that bolt varies.

A lever L is mounted on the bracket $a'$ and has a spring $l^5$, preferably coiled around its pivot, the purpose of which is to exert a stress to move the lever in the direction of the arrow Y when not otherwise prevented. The trip-stop G' has an arm $g^{11}$, adapted to engage a slot $l$ in the lever L. A pitman-rod L' connects the said lever L to the arm $H^3$ and is made adjustable in length by means of the slotted link $l'$.

Referring to Fig. 2, it will be seen that the thread is being cut upon the bolt and the carriage is being moved forward, due to the cutting of that thread, the arm $H^3$ moving backward and the weight J' slowly descending. When the arm $H^3$ reaches the end of the link $l'$, it gives the pitman a movement lengthwise in a rearward direction, removes the stop G' from engagement with the pawl $g$, and starts the timing-disk, which acts through the pitman K, as before described, to move the bolt-carriage and its parts rearwardly preparatory to a succeeding operation.

The preferable means employed for opening and closing the chuck will now be described. The chuck E may be considered as any convenient die-holding chuck and having a collar E', adapted to be moved to and from the chuck to open or close the dies. It is mounted upon a shaft $e$, which receives rotation from the shaft F by means of the pinion $e^\times$ and gear $e'$. The collar E' is controlled by a forked lever $E^2$, pivoted conveniently upon the framework, to which is attached a spring $E^3$, the stress of which is exerted to throw the collar away from the chuck and to open the dies. $e^2$ is a bolt carrying the spring $E^3$ and is pivoted to the lever $E^2$ at $e^3$. The lever $E^2$ is pivoted upon a rock-shaft $E^4$, to which is secured an arm $E^5$, which arm is adapted to be actuated from the timing-shaft to close the chuck at the proper time, as will be now described. The upper end of the lever L has a notch $l^4$ cut therein, which is adapted to engage a projection $e^4$ upon the arm $E^5$. The spring $E^3$ tends to throw the arm $E^5$ downward and the spring $l^5$ tends to throw the lever L toward the lug $e^4$. When the timing-disk is held from rotation, as shown in Fig. 1, the projection $e^4$, engaging the notch $l^4$, holds the die-carrying chuck E closed. When the trip-stop is tripped, the lever L is instantly rocked away from the projection $e^4$, allowing the stress of the spring $E^3$ to open the dies, which will remain open until the parts reach the position shown in Fig. 13, when a cam-surface $g^{13}$, preferably upon the periphery of the disk G, has reached a position in which it engages the extremity of the lever $E^5$. The continued rotation of the disk G raises the said lever and causes the die to close against the stress of the spring $E^3$, and when it reaches its highest point the stress of the spring $l^5$ will snap the notch $l^4$ into engagement with the projection $e^4$ and hold the chuck closed until the lever L is again tripped.

It is sometimes desirable that when deposited upon the carriage the bolt be held from above. The device shown in Figs. 16 and 17 consists of a rock-shaft N, having an arm $n$, adapted to lie on top of the bolt-head at the time the bolt is presented to the chuck. The said arm must of course be rocked away from that position when the carriage is in the position in which it receives a bolt from the chute. A spring $n'$, preferably coiled around said shaft and attached thereto, exerts its stress to rock the said arm. An arm $n^2$, preferably having an antifriction termination, also extends from the said shaft at a convenient point between the bearings $n^3$ and $n^4$. A plate N', having a curved surface, is conveniently secured to the bracket C'. The curved surface acts as a cam and is engaged by said arm having the antifriction-roller, whereby the shaft is rocked outwardly during the retrograde movement of the carriage and inwardly during the forward movement of the same, as is clearly shown in the drawings.

What I claim as my invention, and desire to secure by Letters Patent, is—

1. In a bolt-threading machine the combination of a die-carrying chuck, bolt-moving devices adapted to be moved longitudinally to and from said chuck with a magazine-hopper provided with means for separating one or more bolts at intervals and a chute adapted to receive the bolts thus separated and deliver them to the said bolt-moving devices one by one, the said bolt-moving device adapted to shut off the surplus number of bolts in the bottom of said chute when moved longitudinally toward said chuck, substantially as described.

2. The combination in a bolt-threading machine of a die-carrying chuck with a bolt-gripping device and a weight suitably connected to said device whereby the said weight moves said device toward the said chuck, substantially as described.

3. The combination in a bolt-threading machine of a die-carrying chuck with a bolt-gripping device, a suspended weight suitably connected thereto whereby the said device is moved forward and means adapted to be moved at intervals and connected to said device and to said weight-suspending devices whereby the said device is given its retrograde movement, substantially as described.

4. The combination of a die-carrying chuck and its suitable bolt-gripping devices, with a constantly-revolving shaft, a clutching-disk secured thereto and a disk adapted to be engaged to said clutching-disk at intervals, a suspended weight connected to said moving bolt-gripping devices and adapted to move the same toward the said chuck and a pitman connected to said intermittently-moving disk and to said weight-suspending devices, substantially as and for the purpose set forth.

5. The combination in a bolt-threading machine of a bolt-carrying carriage having a recess into which the bolt to be operated upon is deposited, suitable bolt-gripping devices adapted to grip said bolt when so deposited and a pivoted shuttle adapted to hold the said bolt in a proper position until it is grasped by the said gripping devices, and to fall away from and behind said bolt during the operation of cutting the thread thereon, substantially as described.

6. In a bolt-threading machine the combination of a carriage having a recess into which the bolt to be operated upon is deposited, a plate sliding upon said carriage and carrying bolt-gripping jaws, said sliding plate adapted to be moved forwardly to grip the said bolt, and to then move the said carriage forwardly with it, substantially as described.

7. In a bolt-threading machine the combination of a carriage having a recess into which the bolt to be operated upon is deposited, a plate adapted to slide upon said carriage and having vise-jaws mounted thereon, a suspended weight and means connecting said weight to said sliding plate, the said plate adapted to be first moved to grasp the bolt and then carry the said carriage with it, substantially as described.

8. In a bolt-threading machine the combination of a carriage having a recess into which the bolt to be operated upon is deposited, a plate adapted to slide upon said carriage and having vise-jaws mounted thereon, a suspended weight and means under control of an intermittently-moved part adapted, when the bolt is threaded, to move the said plate rearwardly to release said bolt and then to move the carriage back to its receiving position, substantially as described.

9. In a bolt-threading machine the combination of a carriage having a recess into which the bolt to be operated upon is deposited, a plate adapted to slide upon said carriage and having vise-jaws mounted thereon, a suspended weight, means under control of an intermittently-moved part adapted, when the bolt is threaded, to move the said plate rearwardly to release said bolt and then to move the carriage back to its receiving position, and a stop to limit the forward movement of said sliding plate, substantially as described.

10. In a bolt-threading machine the combination with a die-carrying chuck of suitable bolt-gripping devices, with means for moving said bolt-gripping devices toward said chuck and an intermittently-moved part adapted to be held from movement during the cutting of the thread and means under the control of the moving carriage to trip said part into engagement with a constantly-revolving shaft and to open the die-carrying chuck, said intermittently-moved means adapted to close the said die-carrying chuck, substantially as described.

11. In a bolt-threading machine the combination of a die-carrying chuck with a sliding carriage adapted to present the bolt to be operated upon to said chuck, suitable gripping devices mounted upon said carriage and means for operating said gripping devices and moving said carriage toward said chuck, an intermittently-moved part, means under the control of the sliding carriage for tripping said part into engagement with a constantly-rotating shaft and means connected to said intermittently-moved part and to said carriage whereby the movement of said part releases the threaded bolt and moves the said carriage back to its receiving position, substantially as described.

12. In a bolt-threading machine the combination of a die-carrying chuck with a sliding carriage adapted to present the bolt to be operated upon to said chuck, suitable gripping devices mounted upon said carriage and means for operating said gripping devices and moving said carriage toward said chuck, an intermittently-moved part, means under the control of the sliding carriage for tripping said part into engagement with a constantly-rotating shaft, means connected to said intermittently-moved part and to said carriage whereby the movement of said part releases the threaded bolt and moves the said carriage back to its receiving position, and a stop to prevent the said intermittently-moved part from rotating backward when disengaged from said shaft, substantially as described.

13. The combination of a die-carrying chuck and a carriage upon which the bolt to be operated upon is deposited, gripping devices mounted upon said carriage, an intermittently-moved part and means connecting said part to said chuck whereby said chuck is closed as the bolt to be operated upon is being presented thereto, means for holding said chuck in its closed position and means for opening it quickly to release the threaded bolt, substantially as described.

14. In a bolt-threading machine the combination of the carriage adapted to receive the bolt to be operated upon, suitable gripping devices mounted upon said carriage and adapted to grip the stem of said bolt, a rock-shaft having an arm and means for rocking said shaft whereby the said arm presses upon the head of said bolt during the operation of cutting a thread thereon and moves away therefrom during the retrograde movement of the carriage, substantially as described.

JAMES A. PLOPPER.

Witnesses:
ARTHUR JOHNSON,
CHAS. A. STEWARD.